United States Patent [19]

Kadomukai et al.

[11] Patent Number: 4,922,869
[45] Date of Patent: May 8, 1990

[54] TORQUE CONTROLLING APPARATUS FOR INTERNAL COMBUSTION ENGINE

[75] Inventors: Yuzo Kadomukai; Makoto Yamakado; Yozo Nakamura, all of Ibaraki, Japan

[73] Assignee: Hitachi, Ltd., Tokyo, Japan

[21] Appl. No.: 339,106

[22] Filed: Apr. 17, 1989

[30] Foreign Application Priority Data

Apr. 18, 1988 [JP] Japan .................................. 63-94843
Jun. 29, 1988 [JP] Japan ................................. 63-159145
Aug. 19, 1988 [JP] Japan ................................. 63-204718

[51] Int. Cl.⁵ .......................................... F02B 75/06
[52] U.S. Cl. ................................................ 123/192 R
[58] Field of Search ............... 123/192 R, 198 R, 419, 123/436; 364/431.08

[56] References Cited

FOREIGN PATENT DOCUMENTS

| 3230607 | 2/1984 | Fed. Rep. of Germany ... 123/192 R |
| 0112834 | 9/1980 | Japan .............................. 123/192 R |
| 0185937 | 10/1983 | Japan .............................. 123/192 R |
| 0122754 | 7/1984 | Japan .............................. 123/192 R |
| 0158331 | 9/1984 | Japan .............................. 123/192 R |
| 0061925 | 3/1986 | Japan .............................. 123/192 R |
| 0061927 | 3/1986 | Japan .............................. 123/192 R |
| 0061931 | 3/1986 | Japan .............................. 123/192 R |
| 0066818 | 4/1986 | Japan .............................. 123/192 R |
| 0171612 | 8/1986 | Japan . |

Primary Examiner—Willis R. Wolfe
Attorney, Agent, or Firm—Antonelli, Terry & Wands

[57] ABSTRACT

A torque controlling apparatus for an internal combustion engine comprises an electric machinery for absorbing torque from the internal combustion engine and/or for imparting torque to the internal combustion engine; a memory unit for storing, in advance, waveform characteristics of torque deviation generated by the engine in the respective operative conditions of the engine; a detector for detecting an operative condition of the engine; and a control unit. The control unit reads out the waveform characteristics of torque deviation, from the memory unit, corresponding to the detected operative conditions of the engine detected by the detector. The control unit controls the electric machinery to generate countertorque on the basis of the read-out waveform characteristics to cancel the torque deviation.

16 Claims, 13 Drawing Sheets

TORQUE CONTROLLING APPARATUS FOR INTERNAL COMBUSTION ENGINE

OF THE INVENTION AND RELATED ART STATEMENT

The present invention relates to a torque controlling apparatus for reducing torque deviation torque generated in an internal combustion engine.

It is well known that, in an internal combustion engine, gas torque is changed due to change of internal cylinder pressure caused by suction and compression of mixture and expansion of combustion gas, and a rotational inertia is changed due to displacement of angular position of a connecting rod relative to a crankshaft, resulting in change in intertia torque. When such torque deviation from mean torque is transmitted to various equipments to be driven by the internal combustion engine, torsional vibrations is generated in these equipments to deteriorate the performance thereof or to cause a damage in the equipments. Furthermore, in case of an internal combustion engine mounted onto a vehicle, the reaction of the fluctuation of torque would be transmitted from a cylinder block to an engine mounting or a chassis to cause vibrations of the internal combustion engine or the entire vehicle. In order to suppress the generation of the vibrations, it is necessary to reduce the deviation from means torque, i.e., torque deviation generated by the internal combustion engine.

In order to overcome this problem, Japanese Patent Unexamined Publication No. 61-171612 (JP-A-No. 61-171612) discloses a torque control technique in which a countertorque is applied to the crankshaft in synchronism with the torque increment of the fluctuation of torque generated in the internal combustion engine to thereby cancel the torque deviation.

However, according to the above-described prior art, the torque generated in the internal combustion engine is calculated by the rotational acceleration of the crankshaft. In order to generate the countertorque promptly in response to the torque deviation generated in the internal combustion engine, it is necessary to perform the calculation such as an arithmetic calculation of the rotational acceleration at an extremely high speed. Also, in the case where the high speed calculation cannot be performed, an interval between detections of the deviation of torque generated in the engine should not be elongated. It is therefore difficult to reduce the torque deviation with high precision.

OBJECTS AND SUMMARY OF THE INVENTION

Accordingly, an object of the present invention is to provide a torque controlling apparatus for an internal combustion engine, which is capable of reducing the torque deviation with satisfactorily high precision without a particularly high speed calculation for obtaining the torque deviation generated in the engine.

To this end, according to the present invention, there is provided a torque controlling apparatus comprising an electric machinery capable of absorbing torque from an internal combustion engine and/or imparting torque to the internal combustion engine, a memory means for storing, in advance, characteristics of a waveforms of torque deviation, each of which is in response to the respective of various operating conditions of the internal combustion engine, a detecting means for detecting an operating condition of the internal combustion engine, and a controlling means for reading out the torque deviation waveform corresponding to the operating condition detected by the detecting means and for controlling said electric machinery to generate countertorque corresponding to the read-out waveform, thereby reducing the torque deviation.

According to the present invention, if the operating condition of the engine is known, the torque deviation waveform in this operating condition may be obtained from the memory means. It is therefore possible to immediately control the electric machinery to generate the countertorque so that the torque deviation generated in the engine is cancelled or reduced. Namely, since it is unnecessary to calculate the torque deviation, it is possible to reduce the torque deviation without the high speed calculation circuit therefor.

DETAILED DESCRIPTION OF THE PREFERRED EMBODIMENTS

Figure 1:
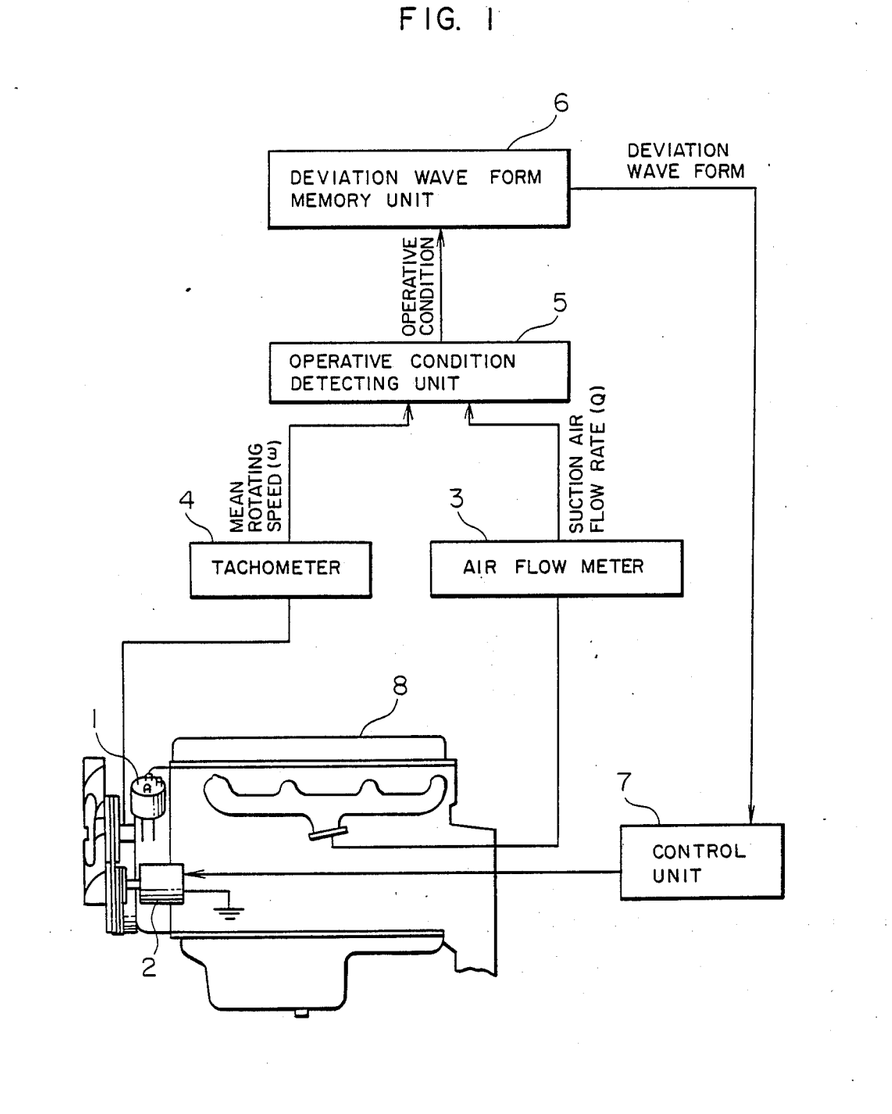
FIG. 1 is a diagram of a system according to a first embodiment of the invention.

Referring now to the accompanying drawings, the present invention will now be described. In FIG. 1, there is shown a first embodiment of the invention which is applied to an internal combustion engine mounted in an automotive vehicle for driving it. A torque controlling apparatus shown in FIG. 1 includes a motor-generator 2 which is one example of an electric machinery, an operative condition detecting unit 5 for detecting the operative condition of the internal combustion engine, a torque waveform memory unit 6 for storing, in advance, waveforms $\Delta T(=T-Tm$: where T is the generated torque and Tm is the mean torque) of torque deviation generated in the internal combustion engine in the respective operative conditions, and a control unit 7 for controlling the motor-generator 2. The motor-generator 2 is coupled to a crankshaft of the internal combustion engine 8 through a V-velt and integrally mounted on the engine. The operative condition detecting unit 5 is provided with an air flow meter 3 for detecting an amount of air sucked into the internal combustion engine 8 and a tachometer 4 for detecting a mean rotating speed of the internal combustion engine 8. The unit 5 determines the operative condition of the engine on the basis of the detected sucked air amount and the detected mean rotating speed of the engine. The control unit 7 reads out the waveform of the torque which is regard as the torque generated in the internal combustion engine, from the torque waveform memory unit 6, on the basis of the detected operative condition of the engine. The control unit 7 controls the motor-generator 2 on the basis of the read-out waveform to generate countertorque to cancel the torque deviation. The operative condition of the internal combustion engine, in particular, the torque deviation of the engine to be controlled by the torque controlling apparatus according to the invention depends upon a change in internal cylinder pressure. Accordingly, the operative condition may be determined by the amount of the sucked mixture to be burnt and the mean rotating speed of the internal combustion engine. Therefore, the easiest way to know the operative condition of the engine is to know the fuel supply rate for the combustion and the associated mean rotating speed of the engine. The fuel supply rate in the two factors may immediately be obtained from a flow rate Q of sucked air, detected by the air flow meter 3 if the rate of air/fuel mixture gas sucked into the cylinders is kept constant. The mean rotating speed $\omega$ of the internal combustion engine may be detected by the tachometer 4. According to the above-described method, the operative condition detecting unit 5 of the embodiment can determine the operative condition of the engine. It should be however, noted that the above-described method is one typical example to know the operative condition of the engine in the easiest ways. In order to readily know the suction air amount, it is possible to utilize a throttle opening degree signal from a throttle position sensor or the more conveniently realize the specific detection of the operative condition of the engine in more detail by detecting other quantities of state such as a cooling water temperature, an oil temperature and a gear position of the transmission.

Figure 2:
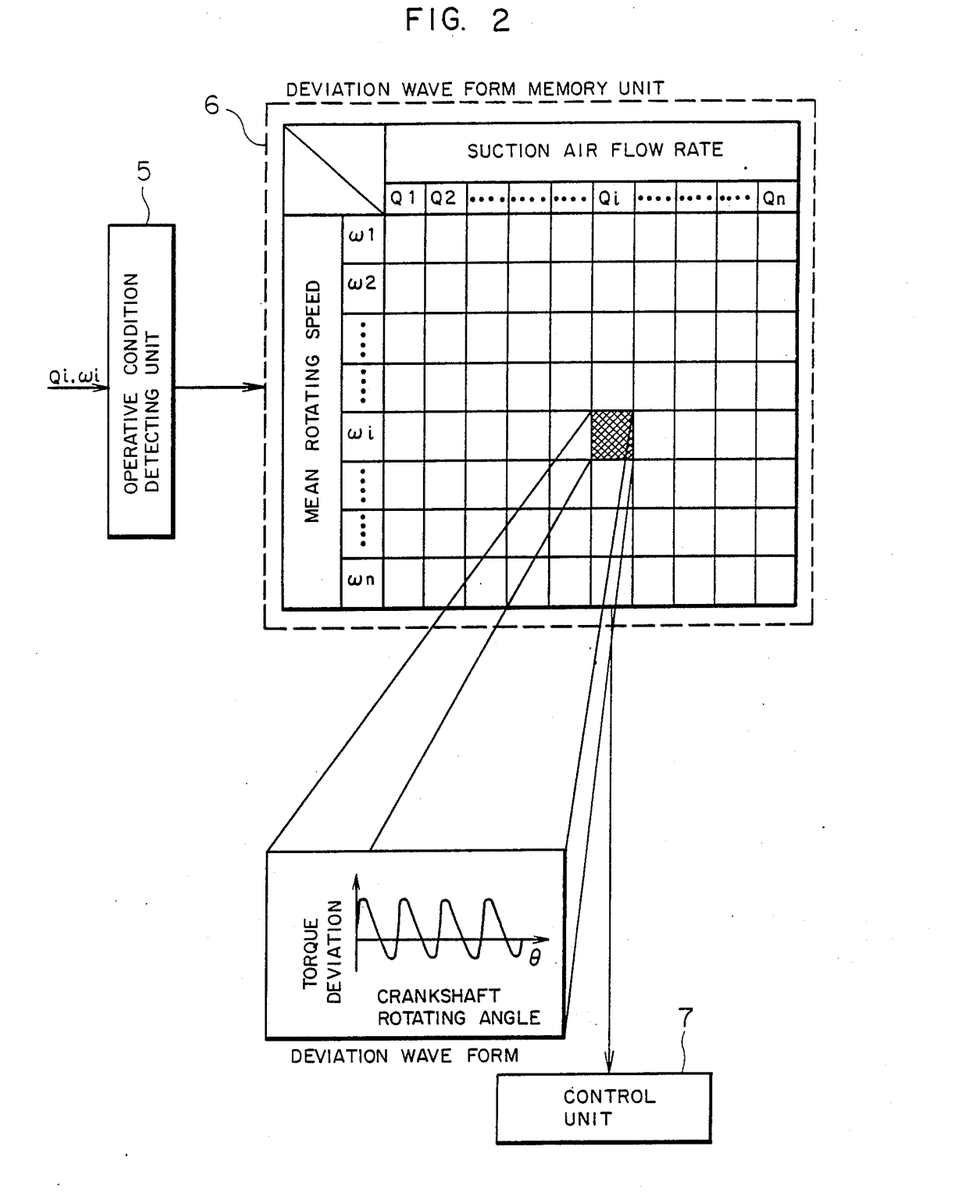
FIGS. 2 and 3 are illustrations of characteristics of torque deviation stored in a torque waveform memory unit, respectively.

The torque deviation waveform memory unit 6 stores a waveform part of torque deviation generated in the internal combustions engine every minimum detectable rotational angle of the crankshaft by a crank angle sensor 1, with respect to the respective operative conditions. Further, the torque deviation waveform memory unit 6 outputs the torque deviation waveform corresponding to one generated in the engine in response to the detected operative condition of the engine by the operative condition detecting unit 5 (sucked air amount Q and mean rotating speed $\omega$) in synchronous with the rotational pulse output every detected angle of the crankshaft from the crank angle sensor 1. It is therefore possible to faithfully realize the waveform of torque deviation generated in rotational angular position of the crankshaft of the engine (FIG. 2). According to this embodiment, the torque deviation waveform memory unit 6 stores the waveform of the torque deviation generated in the engine in every minimum detectable rotational angle of the crankshaft by the sensor 1. However, in the case where the resolving power relative to the rotational angle of the crankshaft is not so restrictively required, it is sufficient to increase the interval of the rotational angle of the crankshaft to be detected and at the same time to use the rotational pulses output in every one degree from the crank angle sensor 1, as synchronous signals when the torque waveform stored in the memory unit is output by dividing the rotational pulses so as to conform with the stored rotational angle interval.

Also, in another torque deviation waveform memory unit where the torque deviation waveform may be represented by a function fn of the sucked air amount Q, the mean rotating speed $\omega$ and a crankshaft angle $\theta$, it is sufficient to store the function fn for representing the waveform of the torque deviation and its coefficients $K_1, \ldots, K_N$ in the memory unit. If the waveform of the torque deviation ($\Delta T = fn(K_1, \ldots, K_N, Q, \omega, \theta)$) at each angular degree of the crankshaft is calculated by using these coefficients (see FIG. 3), and the calculated value is output into the control unit 7 in synchronous with a rotational pulse output at every one degree from the crank angle sensor 1, it is possible to faithfully realize the waveform of the torque deviation generated at every rotational degree of the crankshaft of the internal combustion engine in the same manner as in the case shown in FIG. 2.

Figure 3:
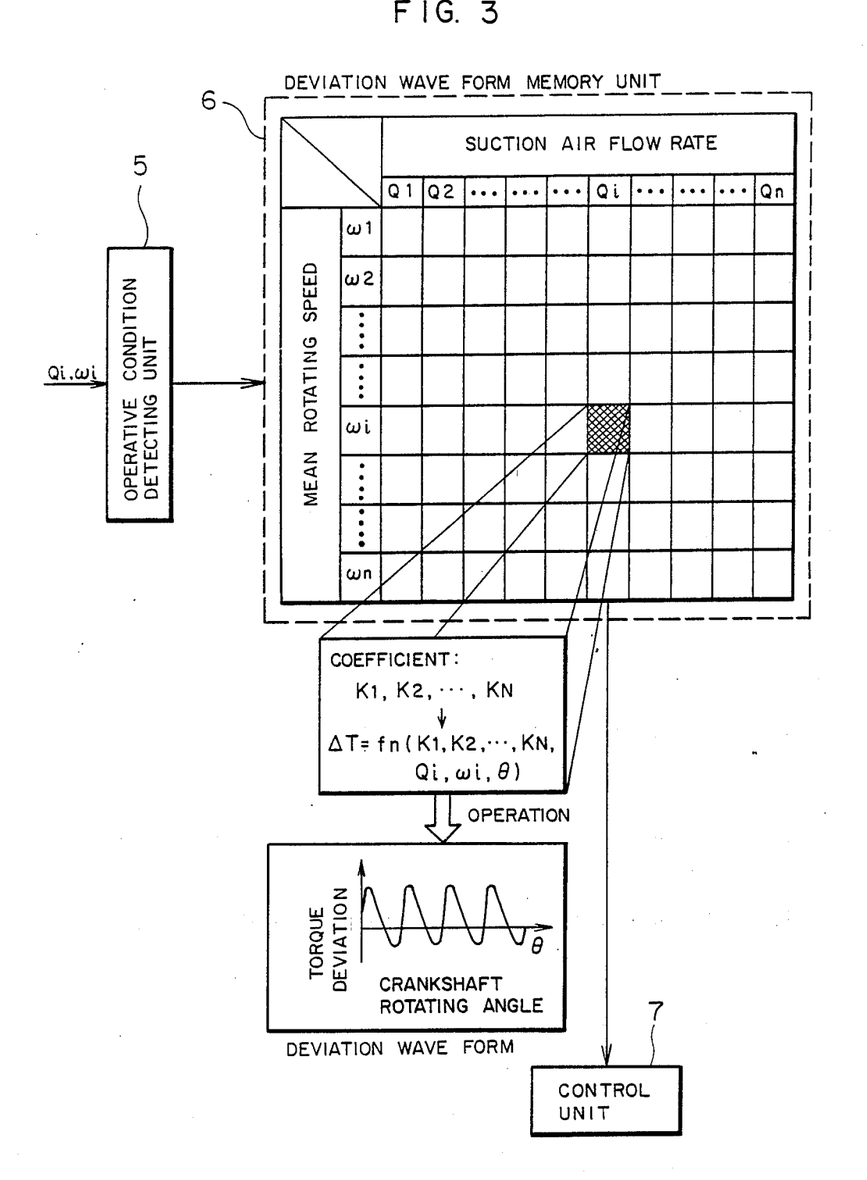

The difference between the cases shown in FIGS. 2 and 3 will now be described hereinunder. In the case shown in FIG. 2, since the waveform of the torque deviation is all stored in advance as the characteristics of the waveform itself, it is unnecessary to perform the calculation in the torque deviation waveform memory unit 6 at all but a large memory capacity for storing the torque waveform is required. In contrast, in the case shown in FIG. 3, since the waveform of the torque deviation may be stored in the form of the coefficients for the characteristics, it is possible to reduce the memory capacity but it is necessary to calculate the torque waveform by using the coefficients. Therefore it is necessary to perform some calculation in the torque deviation waveform memory unit 6. Which method should be employed is determined according to the relationship between the calculation performance and the memory capacity of the torque deviation waveform memory unit 6.

Figure 4:
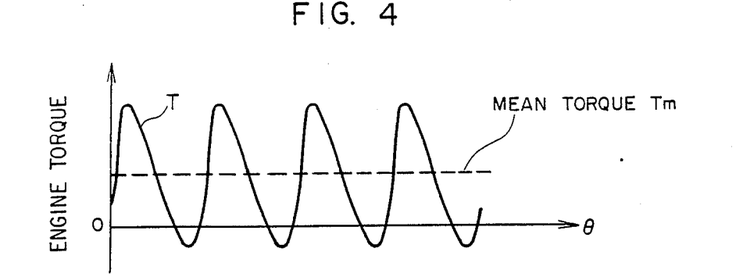
FIG. 4 is a graph showing a fluctuation of torque generated in an internal combustion engine.
Figure 5:
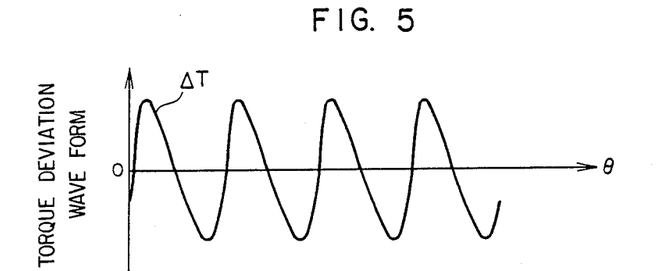
FIG. 5 is a graph showing a waveform of the torque deviation stored in the torque waveform memory unit.

The operation of the above-described embodiment will now be described hereinunder with reference to FIGS. 4 to 7. FIG. 4 is a graph showing an example of the change of torque T generated in the internal combustion engine. FIG. 5 is a graph showing a waveform of the torque deviation $\Delta T$ outputted from the torque deviation waveform memory unit 6 when the torque shown in FIG. 4 is generated in the engine. In the torque deviation waveform memory unit 6, there is only stored the torque deviation $\Delta T(=T-Tm)$ causing a torsional vibration or a change of speed the engine.

The control unit 7 controls the motor-generator 2 to operate as an electric motor to absorb extra torque generated by the engine on the basis of the waveform of the torque deviation read out from the torque deviation waveform memory unit 6, when the waveform is positive, that is, when the torque T generated by the engine is larger than the mean torque Tm (there is extra torque). Inversely, the control unit 7 controls the motor-generator as an electric motor to generate and impart torque to the internal combustion engine to compensate for an insufficient amount of torque, when the waveform is negative, that is, when the torque T generated in the engine is smaller than the mean torque Tm (there is insufficient torque).

Figure 6:
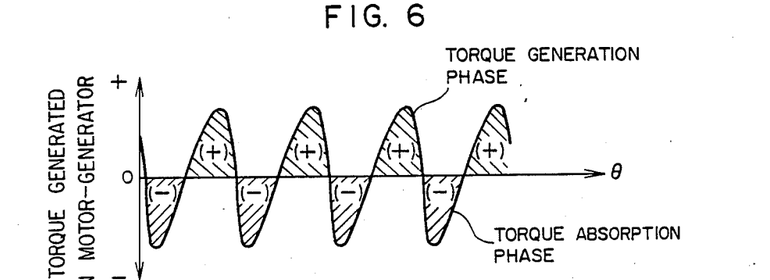
FIG. 6 is a graph showing torque absorbed or generated by an electric machinery.

FIG. 6 is a graph showing the waveform of torque absorbed or generated by the motor-generator 2. Under the control, the torque deviation $\Delta T$ is cancelled by the generation/absorption torque of the motor-generator shown in FIG. 6. The controlled torque generated in the engine is made smooth or flat without any deviation as shown in FIG. 7.

Figure 7:
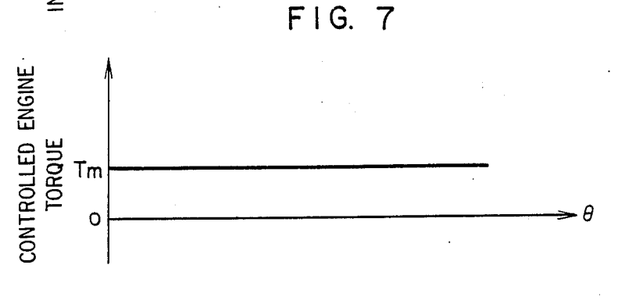
FIG. 7 is a graph showing controlled torque generated in the internal combustion engine.

As described above, by performing the torque control, it is possible to readily remove only the torque deviation with a high accuracy with respect to the torque generated in the internal combustion engine, as shown in FIG. 7.

Also, when a deviation component of a frequency synchronous with the combustion process of the engine in the deviation of torque generated in the engine is remarkable, the wavefrom of the torque deviation stored in the torque deviation waveform memory unit 6 might be regarded as a sine wave or a rectangular wave of the frequency synchronous with the combustion process of the engine, to ensure substantially the same effect as in the above-described case. The combustion process of the engine is performed several times equally corresponding to the number of the cylinders of the engine during one combustion cycle (720 degrees (720°) in case of a four cycle engine and 360 degrees (360°) in case of two cycle engine in terms of the crank angle of the crankshaft). Therefore, the sine or the rectangular wave of frequency in synchronism with the combustion process of the engine completely means a sine wave or a rectangular wave having a period, a value (a rotational angle of the crankshaft) of which is obtained by dividing one combustion cycle of the engine by the number of the cylinders. Thus, in the case where the waveform of the torque deviation to be stored in the torque deviation waveform memory unit 6 is simulated by the sine or the rectangular wave of frequency synchronous with the combustion process of the engine, the torque deviation waveform memory unit 6 may sufficiently store only an amplitude of the sine or the rectangular wave and the crank angle of the crankshaft for synchronizing the sine or the rectangular wave with the combustion process. Therefore, the calculation performance and the memory capacity to be awarded to the torque deviation waveform memory unit 6 may be considerably decreased.

Figure 8:
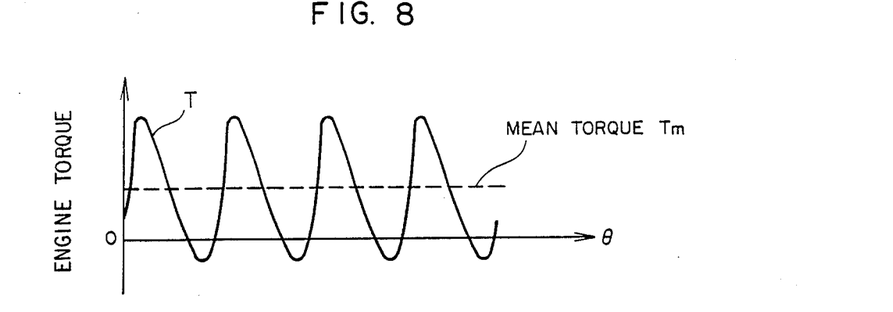
FIGS. 8 to 11 are graphs showing a fluctuation of torque generated in an internal combustion engine, a torque deviation waveform stored in a torque waveform memory unit, torque waveform absorbed by a generation, and controlled torque generated in the internal combustion engine in accordance with a second embodiment of the invention, respectively.
Figure 9:
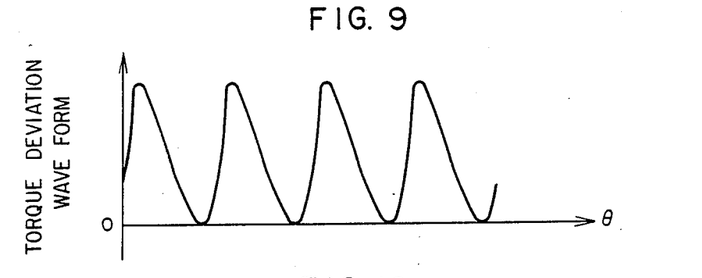
Figure 10:
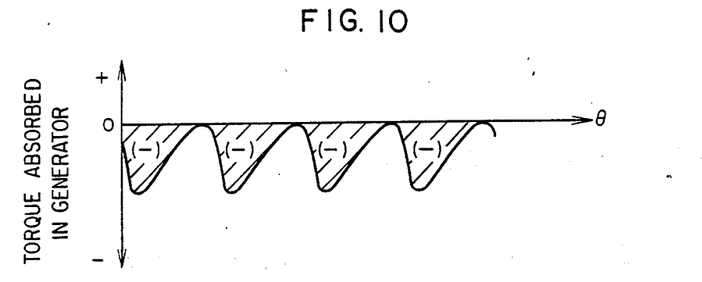
Figure 11:
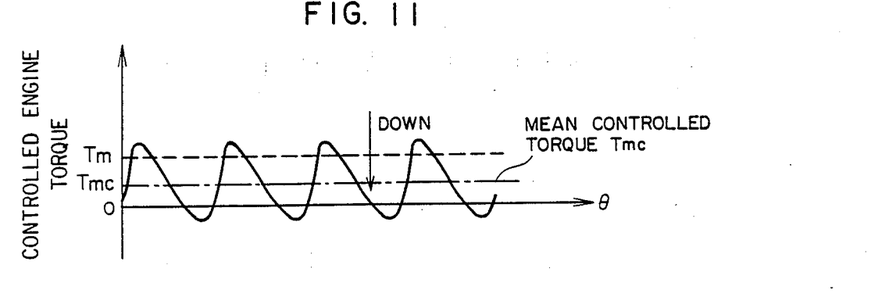

FIGS. 8 to 11 show the second embodiment of the invention in which an electric generator is employed as an electric machinery and is used as a loading means. FIG. 8 is a graph showing a fluctuation of torque generated in the engine. FIG. 9 is a graph showing a waveform of torque deviation stored in the torque deviation waveform memory unit. FIG. 10 is a graph showing a torque waveform absorbed by the electric generator controlled by the control unit. FIG. 11 is a graph showing a controlled fluctuation of torque generated in the engine. The electric generator cannot impart torque to the engine but may absorb torque from the engine. Therefore, when the torque generated by the engine is large, the electric generator is controlled to absorb large torque. Inversely, when the torque generated by the engine is small, the electric generator is controlled to absorb small torque.

Figure 12:
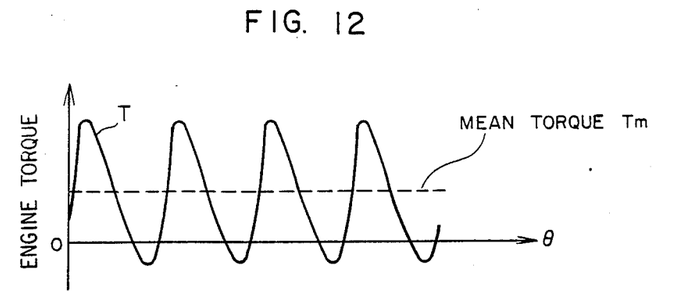
FIGS. 12 to 15 are graphs showing a fluctuation of torque generated in an internal combustion engine, a torque deviation waveform stored in a torque waveform memory unit, torque waveform generated in a motor, and controlled torque generated in the internal combustion engine in accordance with a third embodiment of the invention, respectively.
Figure 13:
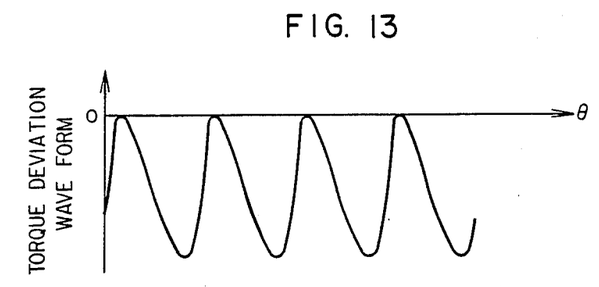
Figure 14:
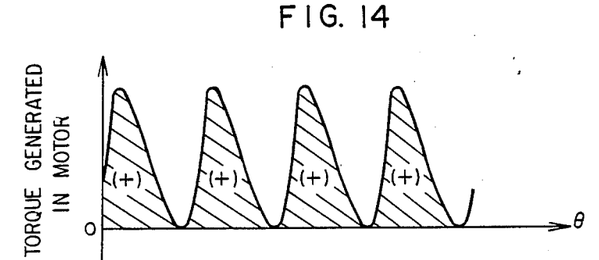
Figure 15:
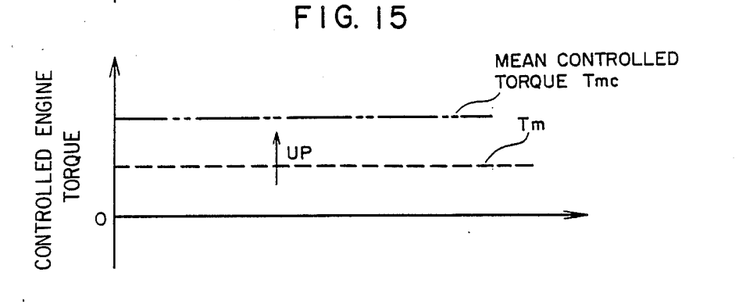

FIGS. 12 to 15 show a third embodiment of the invention in which an electric motor is employed as the electric machinery. FIG. 12 is a graph showing a fluctuation of torque generated in the internal combustion engine. FIG. 13 is a graph showing torque deviation waveform stored in the torque deviation waveform memory unit. FIG. 14 is a graph showing a waveform of torque generated by the electric motor controlled by the control unit. FIG. 15 is a graph showing a controlled fluctuation of torque generated by the engine. It is impossible for the motor to absorb torque from the engine but it is only possible to impart torque to the engine. Therefore, when the torque generated by the engine is large, the electric generator is controlled to generate reduced torque. Inversely when the torque generated in the engine is small, the electric generator is controlled to generate increased torque.

A fourth embodiment of the invention will now be described with reference to FIGS. 16 to 25.

Figure 16:
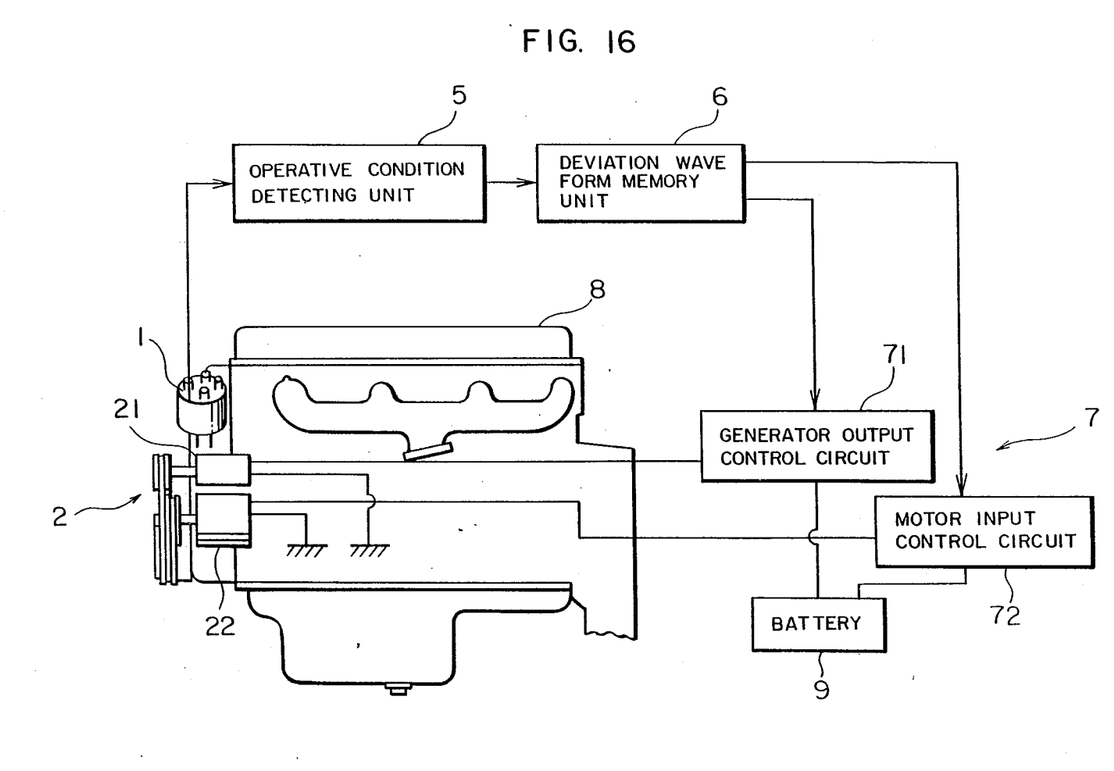
FIG. 16 is a diagram showing a system according to a fourth embodiment of the invention.

In this embodiment, an electric generator 21 and an electric motor 22 which are separated from each other are provided as the electric machinery 2 and are integrally mounted on an internal combustion engine 8. With this arrangement, it is possible to independently and separately control the electric generator 21 and the electric motor 22 (FIG. 16).

Figure 17:
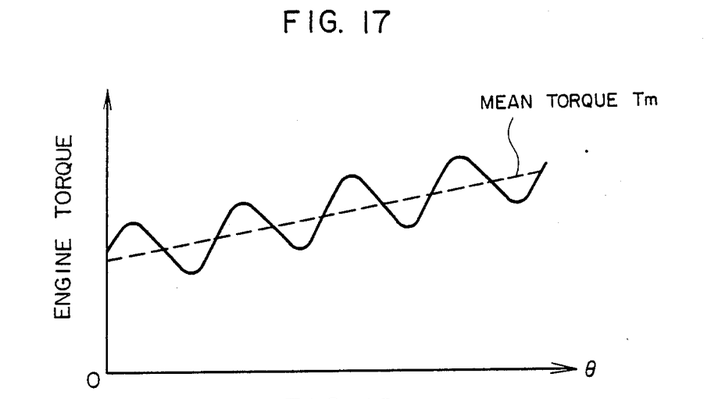
FIGS. 17, 20, 23, 26 and 29 are graphs each showing a fluctuation of torque generated in an internal combustion engine in correspondence with the respective control manners.

FIG. 17 is a graph showing a fluctuation of torque generated in the engine when the vehicle provided with this arrangement is accelerated.

Figure 18:
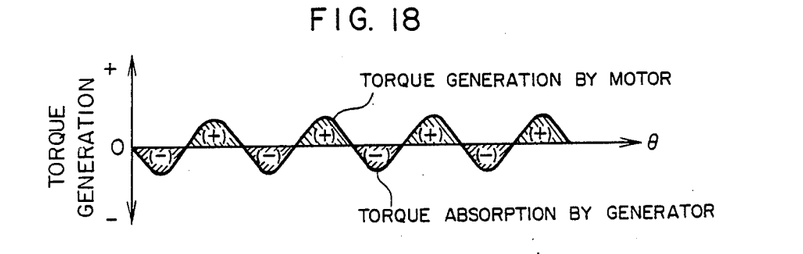
FIGS. 18, 21, 24, 27 and 30 are graphs each showing a waveform of countertorque in correspondence with the respective control manners.

FIG. 18 is a graph showing torque absorbed by the electric generator 21 and torque generated by the electric motor 22 both of which are independently controlled by a control unit 7 (composed of generator output control circuit 71 and a motor input control circuit 72).

Figure 19:
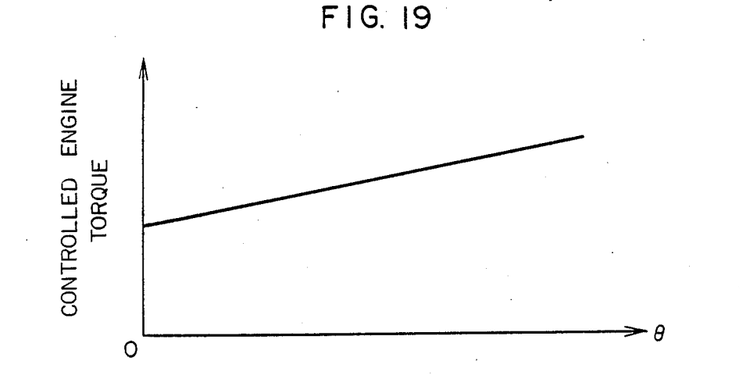
FIGS. 19, 22, 25, 28 and 31 are graphs each showing controlled torque deviation generated in the internal combustion engine in correspondence with the respective control manners.

In this case, the generator 21 and the motor 22 are alternatively controlled by the control unit 7 to generate countertorque shown in FIG. 18 to thereby cancel the torque deviation shown in FIG. 17. As a result, the controlled fluctuation of torque generated by the engine is made smooth or linear as shown in FIG. 19.

More specifically, the generator output control circuit 71 controls the generator 21 in conformity with waveform of the torque deviation read out from the torque deviation wavefrom memory unit 6. When large torque is desired to be absorbed by the generator 21, either one or both of a magnetic field current between a battery 9 and the generator 21 and an output current thereof are to be increased. Inversely, when small torque is desired to be absorbed by the generator 21, either one or both of the magnetic field current and output current are to be reduced.

The electric motor input control circuit 72 controls the motor 22 in conformity with the waveform of the torque deviation read out from the torque deviation waveform memory unit 6. When the motor 22 is required to generate large torque, an armature current flowing from a battery 9 to the motor 22 is to be increased. Inversely, when the motor 22 is required to generate small torque, the magnitude of the armature current is to be decreased.

In general, an internal combustion engine has characteristics such that as the load is increased, the deviation of torque generated in the engine is increased. If the control is effected so that the sum (mean value) of the torque to be absorbed by the generator 21 shown in FIG. 17 is equal to the sum (mean value) of the torque to be generated by the motor 22, the load to be imposed on the engine will not be increased. Accordingly, it is possible to reduce only the torque deviation without increasing the torque deviation.

Figure 20:
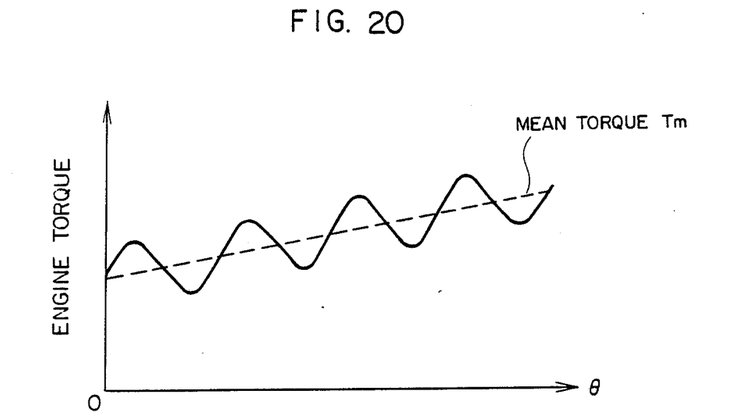
Figure 21:
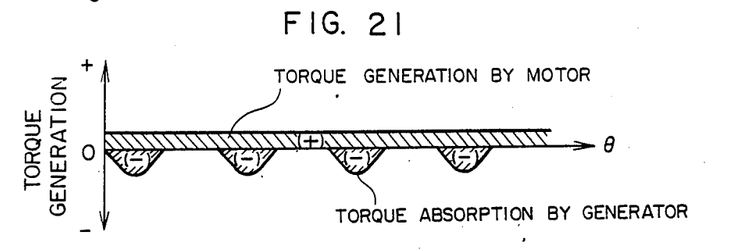
Figure 22:
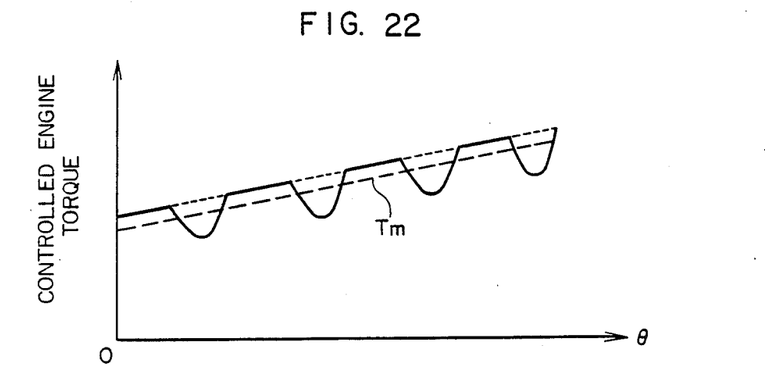

The control manner shown in FIGS. 20 to 22 is effected so that large torque is absorbed by the generator 21 in a crank angle range where the torque deviation is positive, small torque is absorbed by the generator 21 in a crank angle range where the torque deviation is negative, and torque generated by the motor 22 is kept constant all over crank angle range of the crankshaft. The torque absorbed by the generator causes the torque deviation of the engine to be reduced. Since the magnitude of torque which can be absorbed by the generator is limited by the electric generation capacity thereof, in the case where the control is effected by the generator having a small electric generation capacity, it is impossible to remove all the torque deviation. However, if the control is effected so that the sum of torque to be absorbed by the generator 21 is equal to the torque to be generated by the motor 22 (FIG. 21), the load to be applied to the engine is not increased. Therefore, in comparison with the case where no control is effected, it is possible to reduce only the torque deviation without increasing the torque deviation.

Figure 23:
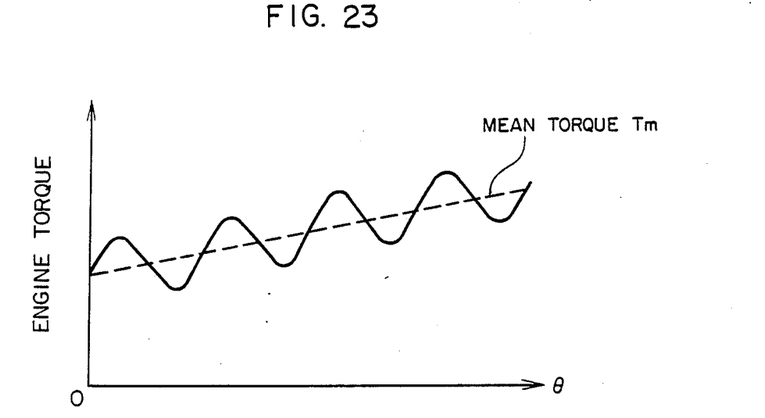
Figure 24:
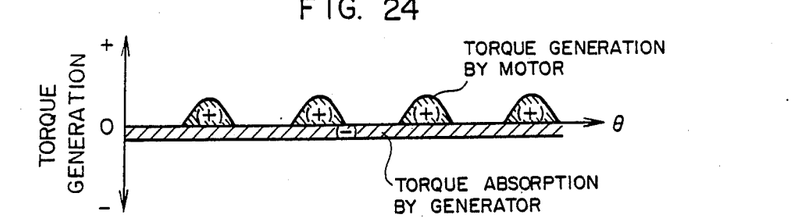
Figure 25:
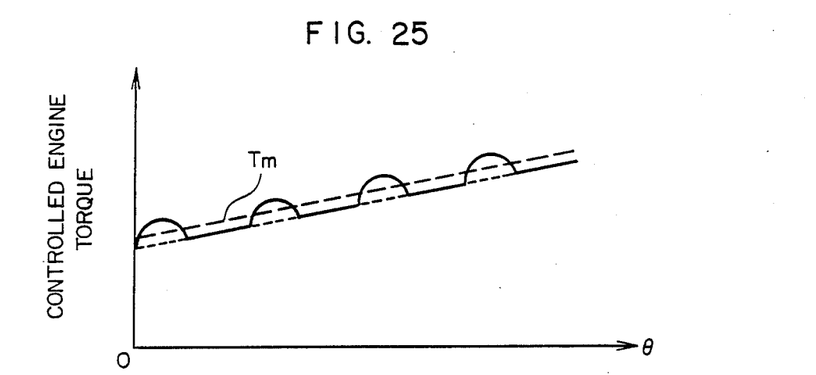

In FIGS. 23 to 25, another control manner is effected so that, in a crank angle range of the crankshaft where the torque deviation is negative, large torque is generated by the motor 22; in a crank angle range where the torque deviation is positive, small torque is generated by the motor 22; and over the entire crank angle range, the torque absorbed by the generator 21 is kept constant. By torque generated by the motor 22, the engine torque deviation is reduced. Since the magnitude of the torque possible generated by the generator 21 is limited by its output capacity thereof, it is impossible to remove all the torque deviation in the case where the control is effected by a small capacity motor. However, if the control is effected so that the sum of torque generated by the motor 22 is equal to torque absorbed by the generator 21 (FIG. 24), since the load to be imposed on the engine is not increased, in comparison with no controlled operation, it is possible to reduce only the torque deviation without increasing the torque deviation.

In the case where a DC motor is used as the motor, when a constant drive voltage is applied to the DC motor, the torque generated by the DC motor exhibits the drooping characteristics relative to the rotational speed. Assuming now that under the condition that torque generated by the engine is fluctuated and the rotational speed is correspondingly fluctuated, the DC motor is driven will the constant voltage, torque generated in the DC motor varies corresponding to the rotational speed change. When the rotational speed is increased (that is, when torque generated in the engine is large), the torque deviation of the DC motor is small, whereas when the rotational speed is decreased (that is, when torque generated in the engine is small), the torque deviation of the DC motor is large. Namely, by using the DC motor under the constant voltage drive, the DC motor automatically adjusts its generated torque so as to keep the rotational speed constant. By effecting the constant voltage drive while setting the mean value of torque generated in the DC motor equal to torque generated by the motor 6 shown in FIG. 21, it is possible to further reduce the torque deviation.

Figure 26:
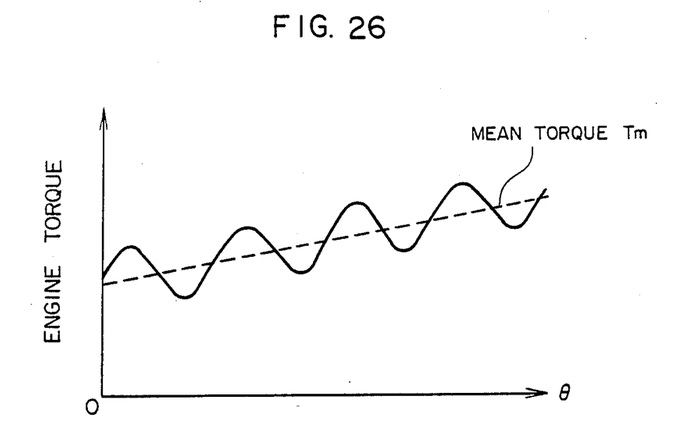
Figure 27:
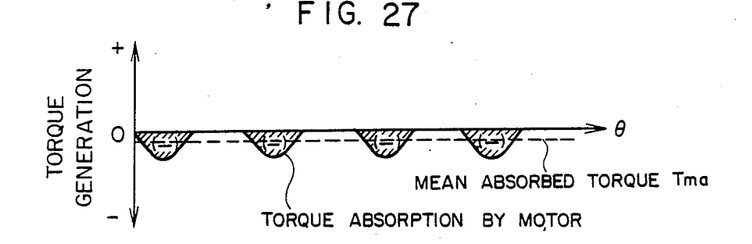
Figure 28:
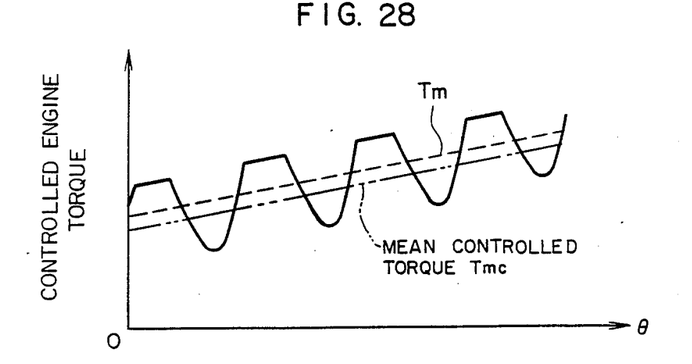

A fifth embodiment of the invention will now be described, in which, when the change amount of the battery 9 is decreased due to the use of the electric loads provided in the vehicle and it is necessary to chage the battery by the generator 21, the electric power generation is performed under the torque control, as shown in FIGS. 26 to 28.

In the case where the electric changing operation is performed by the generator 21, if the electric motor 22 would generate torque to perform the control as in the first embodiment, the electric power generated by the generator 21 would be consumed by the motor 22 and the battery would not be sufficiently changed. Therefore, in such a case, it is necessary to control the torque only with the generator 21 without generating torque from the motor 22. Accordingly, in order to absorb the torque sum needed for charging, instead of the continuous absorption of the constant torque by the generator 21, the torque is periodically or discontinuously absorbed by the generator 21 in response to the waveform of the torque deviation (FIG. 27). It is thus possible to change the battery by the generator 21 without extremely increasing the magnitude of the torque deviation (FIG. 28).

Figure 29:
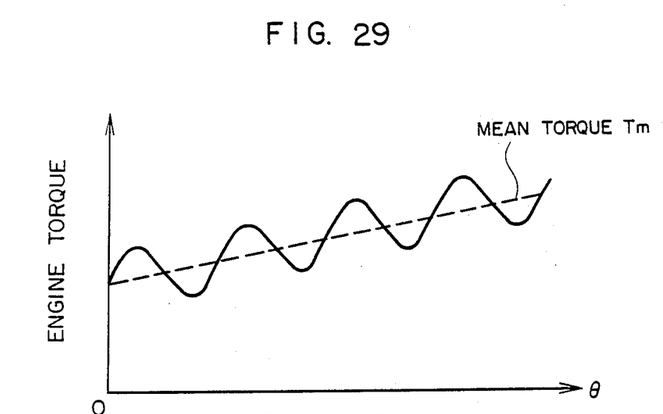
Figure 30:
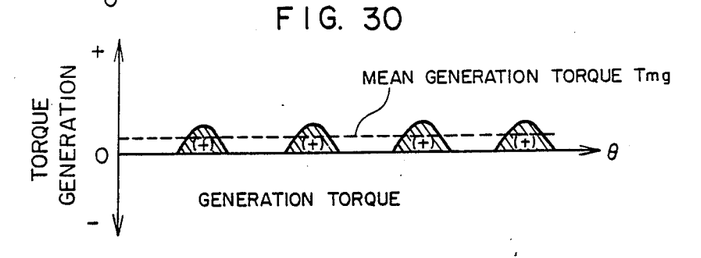
Figure 31:
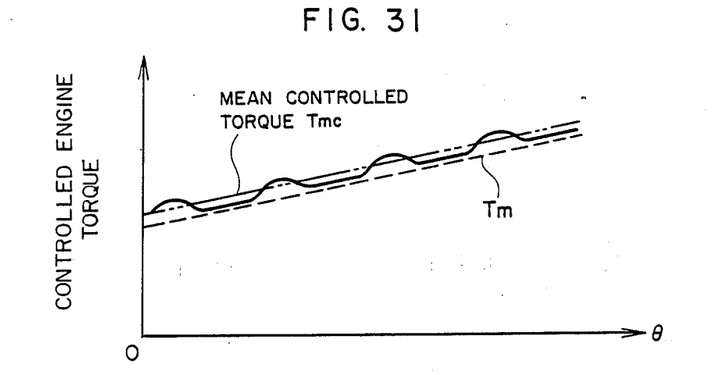

A sixth embodiment of the invention will now be described, in which, in the case where it is necessary to consume the electric power of the battery, under the torque control, the electric power of the battery is consumed by the generator 21. The operation will be explained with reference to FIGS. 29 to 31. In the case where the electric power is consumed by the motor 22, if the control would be effected by absorbing the torque with the generator 21 as in the first embodiment, then the generator 21 would work to generate the electric power, resulting in further charging of the battery. Accordingly, in this case, it is necessary to control the torque only with the motor 22 without the torque absorption of the generator 21. Thus, in the case where the torque is generated by the motor 22 in order to consume the electric power of the battery, instead of that constant torque is generated by the motor 22 to consume constant electric power, the torque is periodically or discontinuously generated by the motor 22 in conformity with the torque deviation whereas the power to be consumed is unchanged (FIG. 30). Therefore, it is possible to further reduce the magnitude of the torque deviation (FIG. 31).

Figure 32:
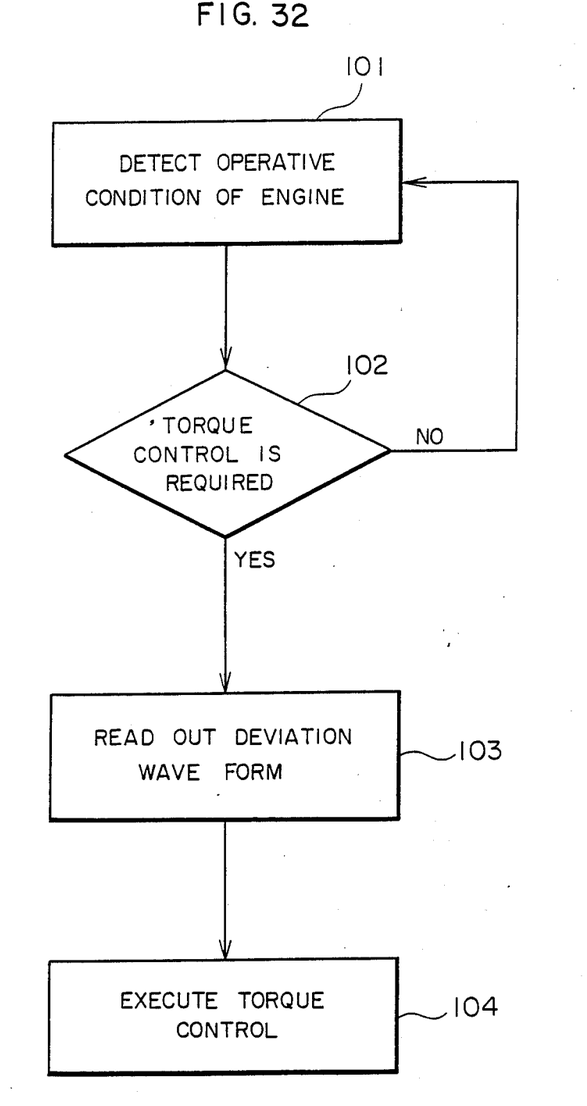
FIG. 32 is a diagram showing a control manner in accordance with another embodiment.

In the foregoing embodiments, by the addition of the control circuit having the steps 101 to 104 shown in FIG. 32, it is possible to more simplify the control unit 7 and the torque deviation waveform memory unit 6.

When the operative condition of the engine is detected in the step 101, in the case where the torque deviation generated is found to be neglibible, the foregoing control is not carried out (step 102). Thus, since the number of the waveform patterns which should be stored in the torque deviation waveform memory unit 6 is reduced, it is possible to use a small capacity memory to simplify the structure. The detection of the operative condition in the step 101 is carried out on the basis of the vehicle travel speed or the treadle depression of the acceleration pedal when the controlling apparatus according to the invention is applied to the vehicle.

What is claimed is:

1. A torque controlling apparatus for an internal combustion engine, comprising:
   an electric machinery for absorbing torque from said internal combustion engine and/or for imparting torque to said internal combustion engine;
   memory means for storing, in advance, waveform characteristics of torque deviation generated by said internal combustion engine in the respective operative conditions of said internal combustion engine;
   detecting means for detecting an operative condition of said internal combustion engine; and
   controlling means for reading out said waveform characteristics of torque deviations from said memory means in correspondence with the detected operative condition of said internal combustion engine detected by said detecting means, and for controlling said electric machinery on the basis of the read-out waveform characteristics to absorb torque from said internal combustion engine and/or impart torque to said internal combustion engine, thereby reducing said deviation of torque.

2. A torque controlling apparatus according to claim 1, wherein said electric machinery includes a motor-generator, and said controlling means controls said motor-generator on the basis of the read-out waveform characteristics to generate countertorque to cancel said torque deviation.

3. A torque controlling apparatus according to claim 1, wherein said electric machinery includes an electric load means for exclusively absorbing torque from said internal combustion engine.

4. A torque controlling apparatus according to claim 1, wherein said electric machinery includes an electric motor for exclusively imparting torque to said internal combustion engine.

5. A torque controlling apparatus according to claim 3, said electric load means includes an electric generator provided on a vehicle on which said internal combustion engine is mounted.

6. A torque controlling apparatus according to claim 1, wherein said waveform characteristics of the deviation of torque stored in said memory means are wave patterns.

7. A torque controlling apparatus according to claim 1, wherein said waveform characteristics of the deviation of torque stored in said memory means are a function representative of wave patterns and a group of coefficients therefor.

8. A torque controlling apparatus according to claim 6, wherein said wave pattern is selected from the group consisting of a sine wave and a rectangular wave which have a period, a value of which is obtained by dividing one combustion cycle of said internal combustion engine by the number of cylinders thereof.

9. A torque controlling apparatus according to claim 6, wherein said detecting means includes means for detecting an amount of mixture gas to flow into said internal combustion engine and means for detecting mean rotating speed of said internal combustion engine, thereby determining said operative condition on the basis of said detected amount of mixture gas and said detected mean rotating speed.

10. A torque controlling apparatus according to claim 1, wherein said electric machinery is integrally mounted on said internal combustion engine.

11. A torque controlling apparatus according to claim 1, wherein said electric machinery includes an electric generator and an electric motor that are separated from each other, and wherein said controlling means independently controls said electric generator and said electric motor on the basis of said read-out waveform characteristics to generate countertorque to cancel said torque deviation.

12. A torque controlling apparatus according to claim 1, wherein said electric machinery includes an electric generator and an electric motor that are separated from each other, and wherein said controlling means controls said electric generator to absorb large torque from said internal combustion engine when torque deviation is positive, controls said electric generator to absorb small torque from said internal combustion engine when torque deviation is negative, and controls said electric motor to generate constant torque to impart it to said internal combustion engine.

13. A torque controlling apparatus according to claim 1, wherein said electric machinery includes an electric generator and an electric motor that are separated from each other, and wherein said controlling means controls said electric motor to impart small torque to said internal combustion engine when torque deviation is positive, controls said electric motor to impart large torque to said internal combustion engine when torque deviation is negative, and controls said electric generator to absorb constant torque from said internal combustion engine.

14. A torque controlling apparatus according to claim 12, wherein said constant torque imparted to said internal combustion engine by said electric motor is zero torque.

15. A torque controlling apparatus according to claim 13, wherein said constant torque absorbed from said internal combustion engine by said electric generator is zero torque.

16. A torque controlling apparatus according to claim 1, wherein said electric machinery includes an electric generator and a DC motor that are separated from each other, and said controlling means controls said electric generator to absorb large torque from said internal combustion engine when torque deviation is positive, controls said electric generator to absorb small torque from said internal combustion engine when torque deviation is negative, and drives said DC motor with constant voltage.

* * * * *